(12) United States Patent
Johnson et al.

(10) Patent No.: US 11,577,341 B2
(45) Date of Patent: Feb. 14, 2023

(54) QUALITY INSPECTION OF LASER MATERIAL PROCESSING

(71) Applicant: The Boeing Company, Chicago, IL (US)

(72) Inventors: Matthew Carl Johnson, Auburn, WA (US); Jessica Adele Boze, Auburn, WA (US)

(73) Assignee: The Boeing Company, Chicago, IL (US)

(*) Notice: Subject to any disclaimer, the term of this patent is extended or adjusted under 35 U.S.C. 154(b) by 382 days.

(21) Appl. No.: 16/871,671

(22) Filed: May 11, 2020

(65) Prior Publication Data

US 2021/0346989 A1    Nov. 11, 2021

(51) Int. Cl.
  *G01N 21/64* (2006.01)
  *G06T 7/00* (2017.01)
  *G01N 21/88* (2006.01)
  *B23K 26/352* (2014.01)
  *G01N 21/95* (2006.01)

(52) U.S. Cl.
  CPC ....... *B23K 26/352* (2015.10); *G01N 21/6402* (2013.01); *G01N 21/6456* (2013.01); *G01N 21/95* (2013.01); *G06T 7/0006* (2013.01); *G01N 2021/8887* (2013.01); *G01N 2201/06113* (2013.01); *G06T 2207/30164* (2013.01)

(58) Field of Classification Search
  CPC ... G06T 7/0002; G06T 7/0004; G06T 7/0006; G06T 2207/10064; G06T 2207/30164; G01N 21/63; G01N 21/64; G01N 21/6402; G01N 21/6447; G01N 21/6456; G01N 2021/646; G01N 2021/8472; G01N 21/88; G01N 21/8803; G01N 2021/8887; G01N 2021/889; G01N 2021/8893; G01N 21/95; G01N 21/956
  See application file for complete search history.

(56) References Cited

U.S. PATENT DOCUMENTS

| | | | |
|---|---|---|---|
| 7,633,033 B2 | 12/2009 | Thomas et al. | |
| 8,030,594 B2 | 10/2011 | Thomas et al. | |
| 8,536,483 B2 | 9/2013 | Thomas et al. | |
| 8,610,025 B2 | 12/2013 | Thomas et al. | |
| 2012/0206717 A1* | 8/2012 | Witz et al. | G01N 21/65 250/200 |
| 2020/0167905 A1* | 5/2020 | Bian et al. | B25J 9/1697 |

* cited by examiner

*Primary Examiner* — Andrew W Johns
(74) *Attorney, Agent, or Firm* — Sage Patent Group (57) ABSTRACT

A method for quality inspection of laser material processing includes performing laser material processing on a workpiece and generating, by a sensor, raw image data of secondary emissions during the laser material processing of the workpiece. The method also includes determining a quality of the laser material processing by analyzing the raw image data of the secondary emissions.

20 Claims, 7 Drawing Sheets

QUALITY INSPECTION OF LASER MATERIAL PROCESSING

FIELD

The present disclosure relates to quality inspection of a manufacturing process and more particularly to a method and system for quality inspection of laser material processing.

BACKGROUND

Manufacturing processes in some industries, such as the aerospace industry for example, require formal documentation that a process was performed in compliance with certain specifications or standards. With respect to laser material processing there are few established techniques for verifying and recording evidence of process compliance. One approach is to create a digital record of the laser equipment process parameters. The primary disadvantage of such an approach is that laser parameters only account for a portion of the variables which are important to laser applications. Other factors, such as degradation of optical components, optical alignment, surface condition and environmental effects are not easily captured by recording systems. Another disadvantage of a data-centric approach is that such data does not directly relate to the quality of the part, and requires technical expertise to perform the analysis and interpret the results.

SUMMARY

In accordance with an example, a method for quality inspection of laser material processing includes performing laser material processing on a workpiece. The method also includes generating, by a sensor, raw image data of secondary emissions during the laser material processing of the workpiece. The method further includes determining a quality of the laser material processing by analyzing the raw image data of the secondary emissions.

In accordance with another example, a system for quality inspection of laser material processing includes a sensor for generating raw image data of secondary emissions during laser material processing of a workpiece. The system also includes a processor configured for determining a quality of the laser material processing by analyzing the raw image data of the secondary emissions.

In accordance with another example, an aircraft includes a component on which laser material processing is performed. Quality inspection of the laser material processing includes a set of functions including generating, by a sensor, raw image data of secondary emissions during the laser material processing of the component. The set of functions also includes determining a quality of the laser material processing by analyzing the raw image data of the secondary emissions.

In accordance with an example and any of the preceding examples, wherein the method, system and set of functions further include generating enhanced image data using an image enhancement library. The image enhancement library includes a plurality of image enhancement tools configured to generate the enhanced image data from the raw image data.

In accordance with an example and any of the preceding examples, wherein generating the enhanced image data includes at least one of: applying lens correction to the raw image data; performing contrast enhancement to the raw image data; and performing noise removal to the raw image data.

In accordance with an example and any of the preceding examples, wherein determining the quality of the laser material processing includes verifying compliance of the laser material processing to specification requirements using enhanced image data.

In accordance with an example and any of the preceding examples, wherein verifying compliance of the laser material processing to the specification requirements includes at least one of: verifying a geometry of an area on which the laser material processing was performed using the enhanced image data; verifying a completeness of coverage of the area of the laser material processing using the enhanced image data; and detecting any defects in the area on which the laser material processing was performed using the enhanced image data.

In accordance with an example and any of the preceding examples, wherein the method, system and set of functions further include rejecting the workpiece or reworking the workpiece in response to the quality of the laser material processing failing to meet one or more specification requirements.

In accordance with an example and any of the preceding examples, wherein the method, system and set of functions further include storing a result of analyzing the raw image data and a time stamp associated with the result of analyzing the raw image data for verification of the laser material processing.

In accordance with an example and any of the preceding examples, wherein performing laser material processing includes performing laser material processing on a plurality of portions of the workpiece and wherein generating the raw image data of the secondary emissions during the laser material processing includes generating separate raw image data for each portion of the plurality of portions of the workpiece.

In accordance with an example and any of the preceding examples, wherein the method, system and set of functions further include determining the quality of the laser material processing by analyzing the separate raw image data for each portion of the plurality of portions of the workpiece.

In accordance with an example and any of the preceding examples, wherein performing laser material processing includes performing ablation of a surface of a panel of composite material using a laser, wherein the laser includes a wavelength and an intensity corresponding to a composition of the panel of composite material.

In accordance with an example and any of the preceding examples, wherein generating the raw image data of the secondary emissions includes measuring and recording a wavelength and an intensity of the secondary emissions using the sensor and wherein determining the quality of the laser material processing includes determining a quality of the ablation of the panel of composite material by comparison of the measured wavelength and intensity of the secondary emissions to a minimum wavelength and intensity.

In accordance with an example and any of the preceding examples, wherein the method, system and set of functions further include image enhancement tools configured to generate enhanced image data from the raw image data, wherein the enhanced image data is used to determine the quality of the laser material processing.

In accordance with an example and any of the preceding examples, wherein the method, system and set of functions further include a purge system configured to provide air or gas flow to prevent particles caused by the laser material processing from obstructing the sensor from generating the raw image data of the secondary emissions.

In accordance with an example and any of the preceding examples, wherein the method, system and set of functions further include a memory associated with the processor for storing a result of analyzing the raw image data and a time stamp associated with the result of analyzing the raw image data for verification of the laser material processing.

In accordance with an example and any of the preceding examples, wherein the method, system and set of functions further include a device to perform laser material processing on a plurality of portions of the workpiece and the sensor generates separate raw image data of the secondary emissions during the laser material processing of each portion of the plurality of portions of the workpiece. The quality of the laser material processing is determined by analyzing the raw image data of each portion of the plurality of portions of the workpiece.

The features, functions, and advantages that have been discussed can be achieved independently in various embodiments or may be combined in yet other embodiments further details of which can be seen with reference to the following description and drawings.

DETAILED DESCRIPTION

The following detailed description of embodiments refers to the accompanying drawings, which illustrate specific embodiments of the disclosure. Other embodiments having different structures and operations do not depart from the scope of the present disclosure. Like reference numerals may refer to the same element or component in the different drawings.

The present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

Figure 1:
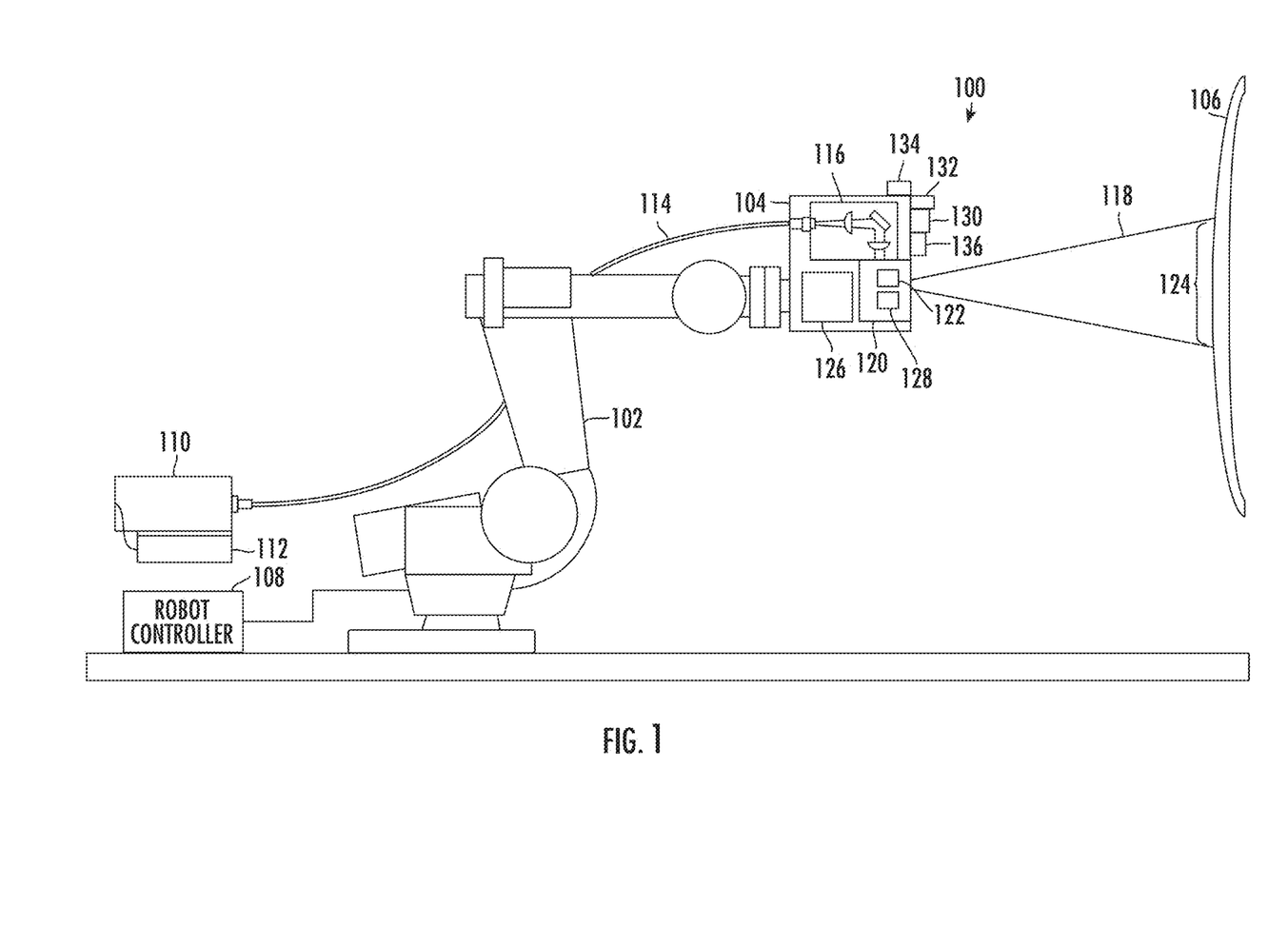
FIG. 1 is an illustration of an example of a system for laser material processing in accordance with an embodiment of the present disclosure.

FIG. 1 is an illustration of an example of a system 100 for laser material processing in accordance with an embodiment of the present disclosure. The exemplary system 100 includes a robot 102 or other mechanism for manipulating an end effector 104 configured to perform the laser material processing on a workpiece 106 and also to perform quality inspection of the laser material processing. In accordance with the example illustrated in FIG. 1, the robot 102 is a six-axis industrial robot with point-to-point motion paths executed by a robot controller 108. In accordance with other examples, any type of robot or mechanism capable of manipulating the end effector 104 or a laser relative to the workpiece 106 for performing laser material processing on the workpiece 106 is useable. Examples of laser material processing include but are not necessarily limited to ablating or removing material from a surface of the workpiece 106, such as laser powder sintering, laser cleaning, oxide removal, surface texturing, laser marking, laser machining, surface activation for adhesion, laser hole drilling, laser welding, etc.

The system 100 also includes a laser source 110, for example, a fiber laser configured to perform the laser material processing on the workpiece 106. The laser source 110 is also referred to herein as simply the laser 110. A laser power supply 112 provides electrical power to the laser 110. The laser source 110 is optically coupled to the end effector 104 by an optical fiber 114. The end effector 104 includes an optics module 116 that is configured to receive a laser beam 118 from the laser source 110 through the optical fiber 114 and to condition the laser beam 118 based on a selected laser application or operation the system 100 is to perform. A scanner device 120 is configured to receive and redirect the laser beam 118 toward the workpiece 106 in two or more axes of motion. The scanner device 120 includes a set of scan mirrors 122. A scan field 124 is an area covered by a full range of motion of the scan mirrors 122. A scanner power supply 126 provides electrical power to the scanner device 120. Computer software 128 is configured to control the scan mirrors 122 and synchronize laser emissions based on the laser process being performed by the system 100. Other optical designs and arrangements are possible, including the use of objective lenses, mirrors and filters, as required by the selected laser process.

In accordance with an example, the workpiece 106 is a part made from a composite material. The laser 110 is a pulsed ultraviolet (UV) laser, e.g., a 55-watt 355 nanometer UV laser or laser source, which is used to prepare composite part surfaces for primer, topcoat, sealants, etc. The system 100 is configured to provide either wide area coverage or only target specific locations for laser material processing.

Figure 2:
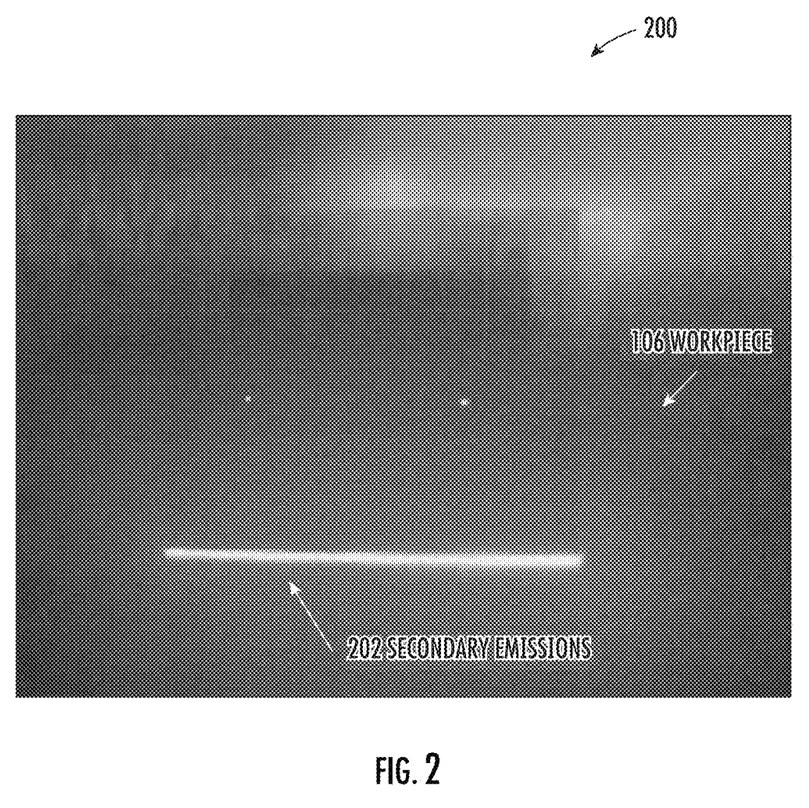
FIG. 2 is an example of an image of secondary emissions acquired by a sensor during laser material processing of a workpiece in accordance with an embodiment of the present disclosure.
Figure 5:
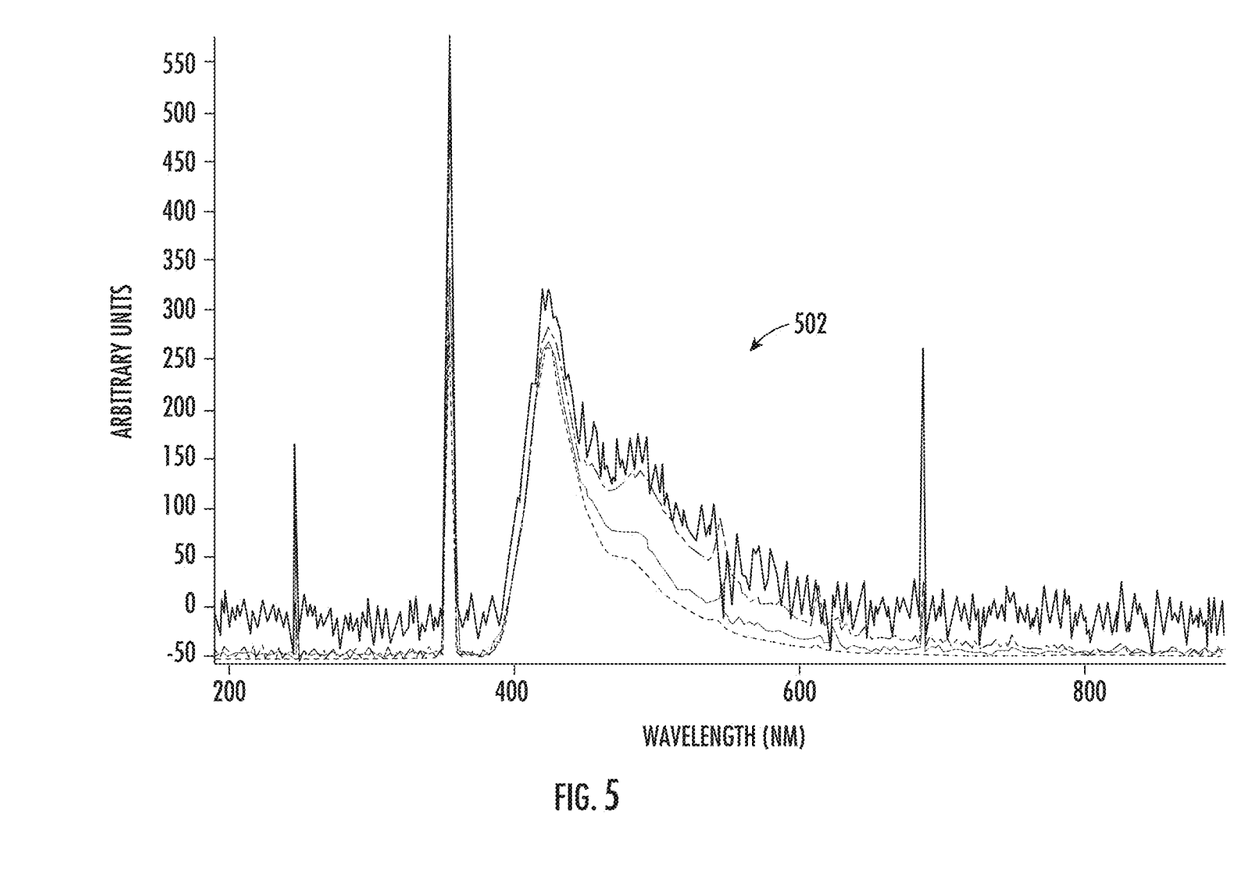
FIG. 5 is an example of secondary emissions during laser material processing of different types of materials for determining a quality of the laser material processing in accordance with an embodiment of the present disclosure.
Figure 6:
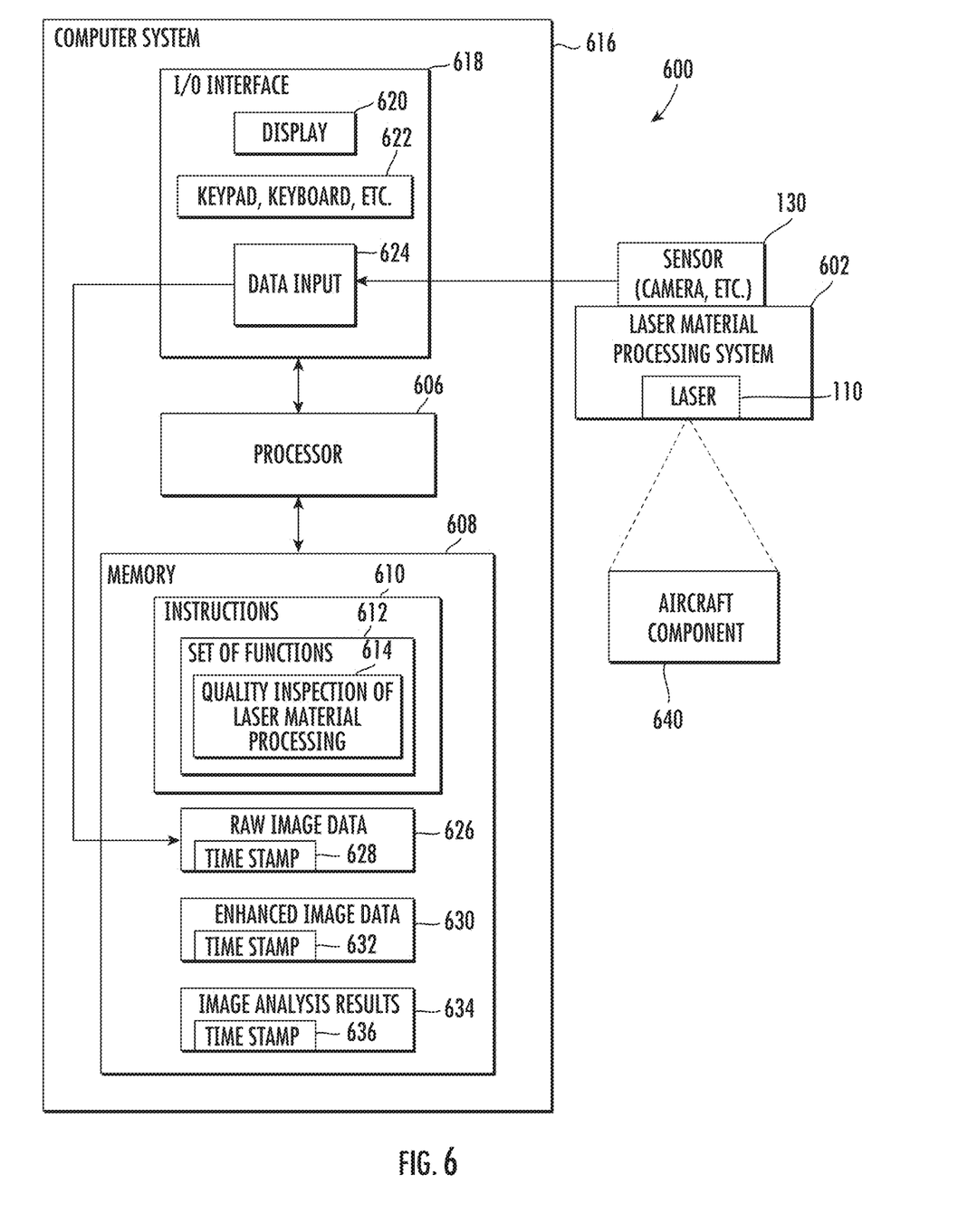
FIG. 6 is a block schematic diagram of an example of a system for quality inspection of laser material processing in accordance with an embodiment of the present disclosure.

The end effector 104 also includes a sensor 130 to acquire an image 200 (FIG. 2) of secondary emissions 202 during the laser material processing of the workpiece 106. In an example, the sensor 130 is a high-resolution CMOS machine vision camera, mounted in an orientation which overlaps the camera's field of view with the laser's scan field 124, either in whole or in part, such that the area of interest on the workpiece 106 can be observed, in focus, by the camera's sensor. In some examples, the sensor 130 includes components, such as lenses, filters, and lighting configured to meet the specific requirements of the laser process being performed by the system 100. The filters are physical hardware filters, such as bandgap and neutral density filters. Referring also to FIG. 2, FIG. 2 is an example of an image 200 of secondary emissions 202 acquired by the sensor 130 during laser material processing of the workpiece 106. As described in more detail herein, a quality of the laser material processing is determined by analyzing the image 200 of the secondary emissions 202 during laser material processing or by analyzing raw image data 626 (FIG. 6). The image 200 includes raw image data 626. As used herein, secondary emissions 202 are defined as any wavelength of light created by laser material processing, e.g., a laser ablation process. For example, during laser ablation of a composite material using an ultraviolet (UV) laser, the laser source 110 emits a narrow band of continuously pulsing 355 nanometer (nm) UV laser light which travels through the optics of the end effector 104 and impacts the workpiece 106. Depending on the characteristics of the material of the workpiece 106, some of the 355 nm UV laser light reflects off the workpiece 106. In some examples, a physical filter, e.g., 430 nm Blue bandgap filter, is used to block all reflected light except the wavelength of light that is of interest for analyzing the secondary emissions 202. When a laser light pulse hits the surface of the workpiece 106, most of the laser energy is absorbed by the workpiece 106, which experiences a rapid local increase in energy. If the laser energy density is above a certain threshold, laser ablation occurs, and material is physically ejected in a plasma plume. If the laser energy is too low, the laser energy is just absorbed as heat. When the next UV laser pulse passes through the plasma plume, the gasses in the plasma plume exhibit UV fluorescence and glow in several visible light wavelengths ("secondary emissions") as illustrated in FIG. 2. Spectral analysis of the UV laser ablation, illustrated in FIG. 5, shows that in addition to 355 nm UV light, other wavelengths of light, e.g., 423 nm, 487 nm, and 543 nm) are created. The secondary emissions 202 result primarily as a function of the laser wavelength and the composition of the plasma plume. Accordingly, different laser applications will result in different wavelengths of secondary emissions. As long as the secondary emissions 202 are not in the same wavelength as the laser, the secondary emissions 202 can be isolated and imaged using optical filters as described herein.

The end effector 104 also includes one or more blow-off air knives 132 configured to maintain a line of sight between the sensor 130 and the workpiece 106 that is free from the plasma plume and other contaminants. The blow-off air knives 132 provide an air curtain during laser material processing to remove the plasma plume from the scan field 124 between the end effector 104 and the workpiece 106. The blow-off air knives 132 also prevent any debris created by the laser material processing from depositing on lenses of the optics module 116, sensor 130, machine vision camera 134 and scanner device 120.

The end effector 104 further includes a purge system 136 configured to provide air or gas flow to prevent particles caused by laser material processing from obstructing the sensor 130 from acquiring the image 200 (FIG. 2) of the secondary emissions 202.

Figure 3A:
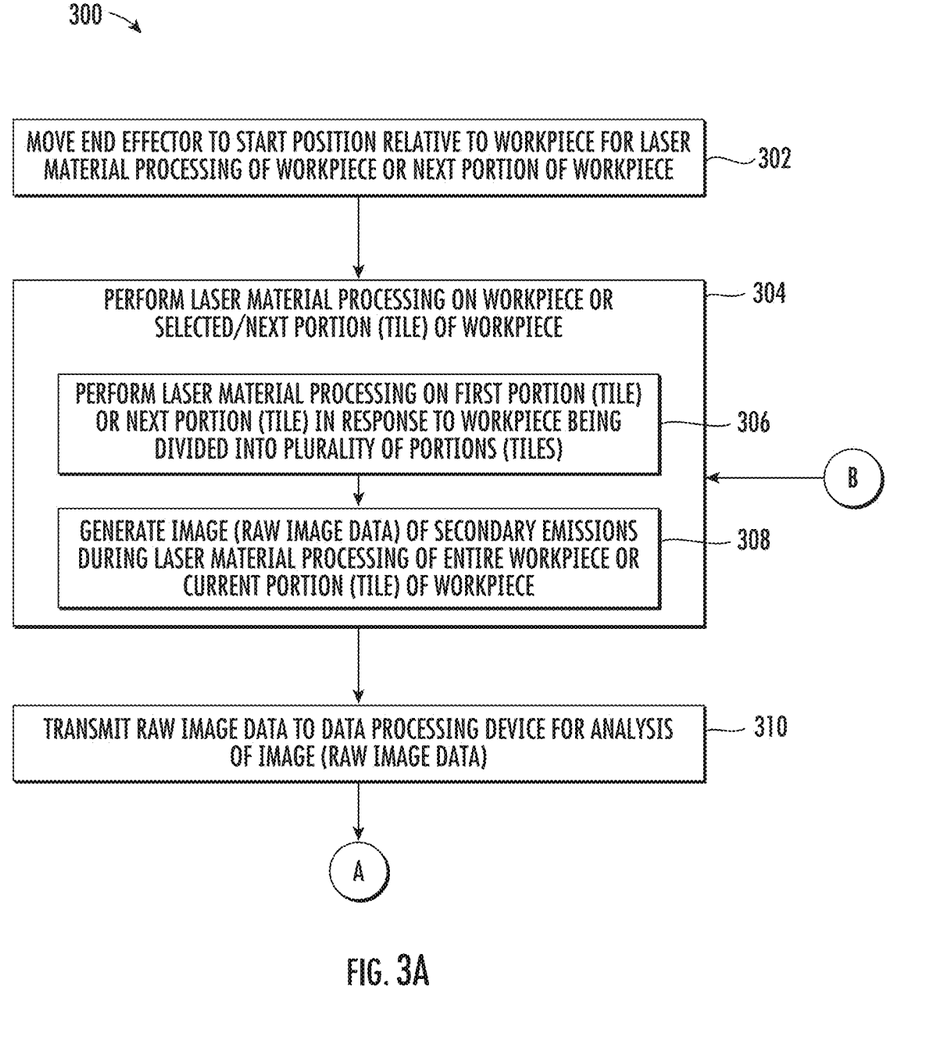
FIGS. 3A and 3B are a flow chart of an example of a method for laser material processing and quality inspection of the laser material processing in accordance with an embodiment of the present disclosure.
Figure 3B:
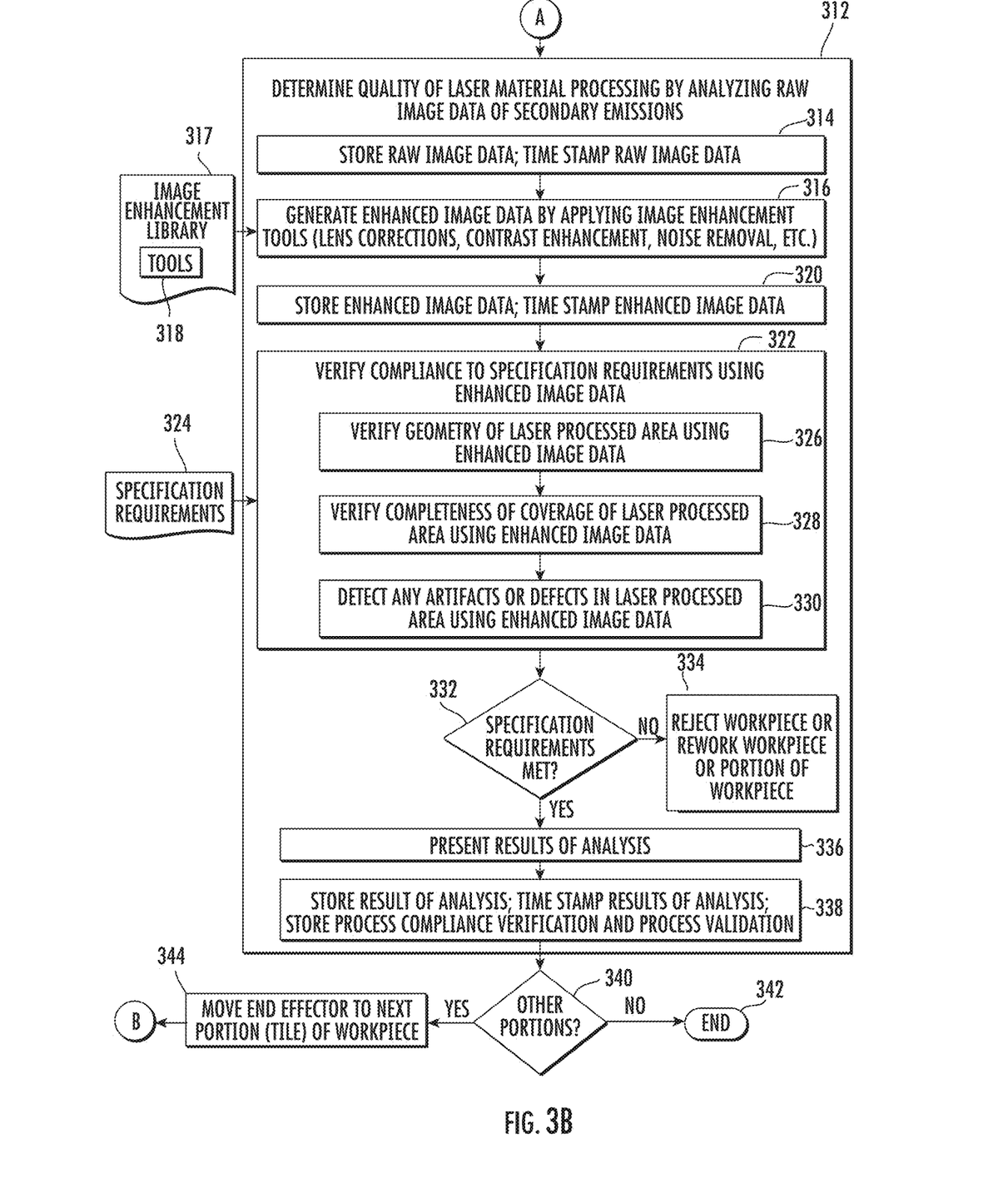
Figure 4A:
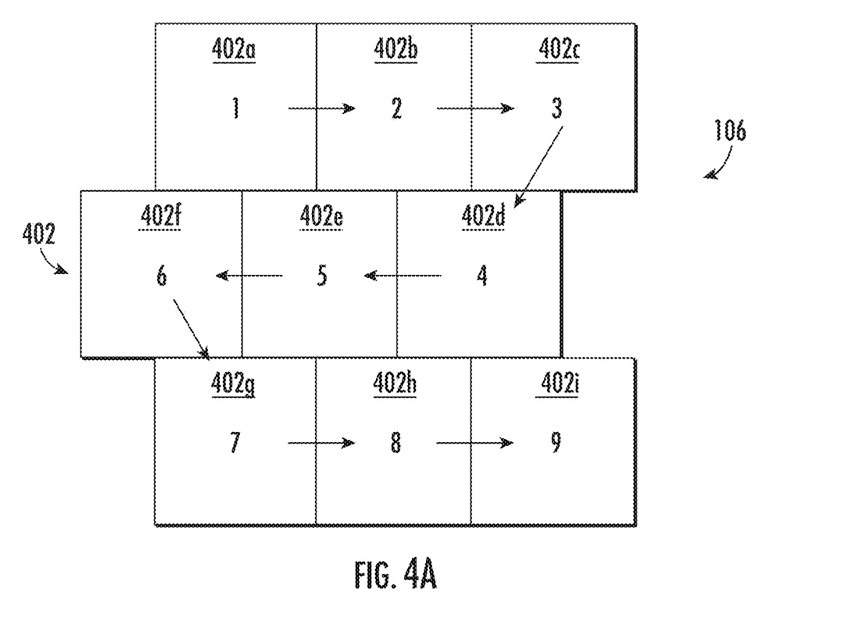
FIG. 4A is an example of a workpiece divided into a plurality of portions for laser material processing in accordance with an embodiment of the present disclosure.
Figure 4B:
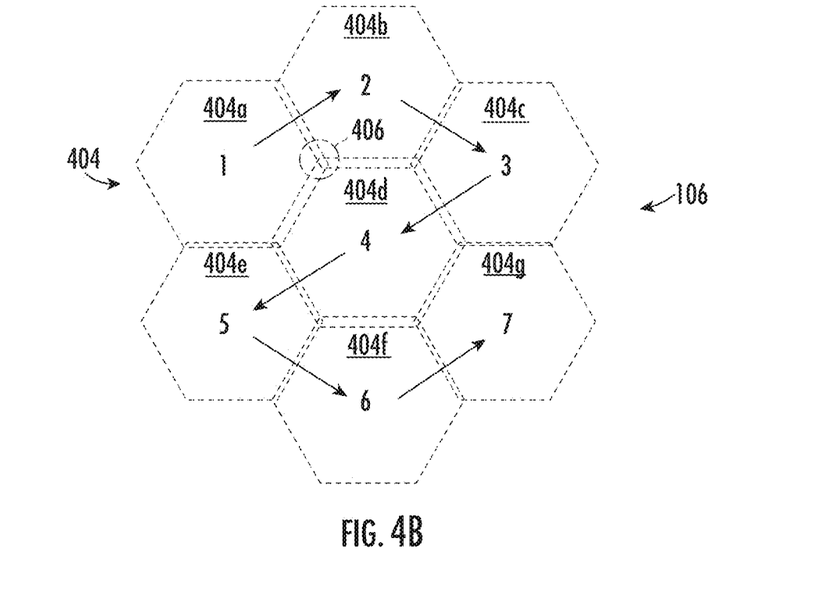
FIG. 4B is an example of a workpiece divided into a plurality of portions for laser material processing in accordance with another embodiment of the present disclosure.

FIGS. 3A and 3B are a flow chart of an example of a method 300 for laser material processing and quality inspection of the laser material processing in accordance with an embodiment of the present disclosure. In accordance with an example, the method 300 is embodied in and performed by the system 100 in FIG. 1 and the system 600 in FIG. 6. In block 302, an end effector 104 (FIG. 1) is moved to a start position relative to the workpiece 106 for laser material processing of the workpiece 106 or to a next portion of the workpiece 106. If the workpiece 106 is large, such as an aircraft wing, fuselage or other component of an aircraft, the workpiece 106 may be defined or subdivided into smaller portions or tiles for separate laser material processing of each portion or tile during an operation. FIG. 4A is an example of a workpiece 106 subdivided into a plurality of portions 402 (labeled 402a-402i) in accordance with an embodiment of the present disclosure. The portions 402 may also be referred to as tiles. In the example illustrated in FIG. 4A, the portions 402 are substantially square shaped. However, in other examples, the portions 402 are any size and shape based on a specific laser material processing operation to be performed, and a size, shape and/or contour of the particular workpiece 106 on which the specific laser material processing operation is to be performed. For example, FIG. 4B is an example of a workpiece 106 subdivided into a plurality of portions 404 (labeled 404a-404g) for laser material processing in accordance with another embodiment of the present disclosure. In the example in FIG. 4B, each of the portions 404 are substantially hexagonal-shaped. Hexagonal-shaped portions 404 provide several advantages. Hexagonal-shaped portions 404 provide more efficient use of the optics of the end effector 104 than square-shaped portions 402 because the hexagonal-shaped portions 404 cover about nineteen percent (19%) more area than square-shaped portions 402. Hexagonal-shaped portions 404 also provide improved wrapping of the portions 404 over a contoured surface, such as a wing, fuselage or other contoured component of an aircraft. Hexagonal-shaped portions 404 also provide a maximum overlap condition of laser material processing of three times (3×) of a corner 406 where three adjacent portions 404 meet, for example, corner 406 where portions 404a, 404b, and 404d meet. In other examples, where the square-shaped portions 402 are not offset as illustrated in FIG. 4A but are aligned with one another in a straight column, a maximum overlap condition for square-shaped portions is four times (4×). A corner where four square-shaped portions meet will be processed four times (4×) during laser material processing. This additional laser energy input can result in stress risers in certain application, e.g., laser ablation, de-painting, etc. Offsetting the square-shaped portions 402 as illustrated in FIG. 4A avoids the four time (4×) overlap condition.

In the examples in FIGS. 4A and 4B, the end effector 104 is moved to a first portion, such as portion 402a or 404a of workpiece 106. Laser material processing is conducted, and one or more images are acquired by sensor 130. Each of the images includes raw image data. The end effector 104 is then moved from the first portion (402a or 404a) to the next portion, such as 402b or 404b of workpiece 106 for laser material processing and so forth, as illustrated by the arrows in FIGS. 4A and 4B, until all portions 402a-402i or 404a-404g or tiles of the workpiece 106 have been processed. In accordance with an example, an image 200 is acquired for the laser material processing of each portion 402 and 404. The images 200 or raw image data may be analyzed individually to determine the quality of the laser material processing or compiled into a single tiled image to determine the quality of the laser material processing. In some examples, the Images 200 or raw image data are analyzed sequentially, immediately after being acquired, to monitor the quality of the laser material processing, or stored and analyzed in batch after completion of laser material processing of the entire workpiece 106, or sections of the workpiece 106.

In block 304, laser material processing is performed on a workpiece 106 or selected portion 402 or 404 of the workpiece 106. The laser material processing in block 304 includes blocks 306 and 308. In some examples, performing the laser material processing includes performing (block 306) the laser material processing on a plurality of portions 402a-402i (FIG. 4A) or 404a-404g (FIG. 4B) of the workpiece 106, and generating (block 308) the raw image data of the secondary emissions during the laser material processing includes generating separate raw image data for each portions 402 or 404 of the plurality of portions 402a-402i or 404a-404g of the workpiece 106. In block 306, the laser material processing is performed on a first portion, such as portion 402a or 404a, and subsequently on a second portion 402b or 404b in response to the workpiece 106 being subdivided into a plurality of portions 402a-402i or 404a-404g as illustrated in FIGS. 4A and 4B. In accordance with an example, performing laser material processing includes performing ablation of a surface of a panel of composite material using a laser 110. The laser 110 includes a wavelength and an intensity corresponding to a composition of the panel of composite material. As previously described, an example of the laser 110 is a pulsed 55-watt, 355 nanometer UV laser, that is used to prepare composite part surfaces for primer, topcoat, sealants, etc.

In block 308, an image 200 (FIG. 2) including raw image data of the secondary emissions is acquired or generated by a sensor 130 (FIG. 1) during the laser material processing of the workpiece 106. As previously described an example of a sensor 130 for acquiring the secondary emissions of the laser material processing and generating the raw image data of the secondary emissions is a high definition camera and optical filters designed to pass specific wavelengths and intensities of light. In accordance with an example, generating the image 200 or raw image data of the secondary emissions includes measuring and recording a wavelength and an intensity of the secondary emissions using the sensor 130, during laser processing. Determining the quality of the laser material processing in block 312 includes determining a quality of the ablation of the panel of composite material by comparison of the measured intensity of the secondary emissions to a minimum intensity at specific wavelengths of interest. Referring also to FIG. 5, FIG. 5 is an example of secondary emissions 202 acquired during laser material processing of different types of materials illustrating a wavelength (horizontal axis in nanometers) and intensity (vertical axis in arbitrary units) of the secondary emissions 202. The secondary emissions 202 are characteristic of the resin chemistry, e.g., an epoxy resin surface, of the workpiece 106 and the wavelength and intensity of the laser 110. In the example in FIG. 5, the laser used is an ultraviolet 255 nanometer wavelength laser and the secondary emissions 202 are visible blue light having a wavelength of 532 nanometers.

In an example where the workpiece 106 is subdivided into a plurality of portions 402 or 404 or tiles as illustrated in FIGS. 4A and 4B, performing the laser material processing in block 306 includes performing laser material processing on separate portions 402 or 404 or tiles of the workpiece 106. Generating the image 200 or raw image data of the secondary emissions during the laser material processing in block 308 includes generating a separate image or raw image data for each separate portion 402 or 404 of the workpiece 106. The quality of the laser material processing is determined by analyzing each separate image 200 or raw image data.

In block 310, the image 200, images, or raw image data of the secondary emissions 202 are transmitted by the sensor 130 to a data processing device. The data processing device is configured to analyze the image 200 or raw image data of the secondary emissions 202 to determine a quality of the laser material processing. An example of a data processing device is a computer system 616 in FIG. 6 that is configured to determine a quality of the laser material processing by analyzing the raw image data 626 of the secondary emissions 202 acquired by the sensor 130.

In block 312, a quality of the laser material processing is determined by analyzing the separate image 200 or the separate raw image data 626 (FIG. 6) of the secondary emissions 202 acquired by the sensor 130 for each portion 402 or 404 of the plurality of portions 402 or 404 of the workpiece 106. In accordance with the example in FIG. 3B, determining the quality of the laser material processing by analyzing the raw image data 626 of the secondary emissions 202 includes the operations described with reference to blocks 314-338. In block 334, the workpiece 106 is rejected or reworked in response to the quality of the laser material processing failing to meet one or more specification requirements 324 as described herein.

As previously described, the secondary emissions 202 are different wavelengths of light that are created by the laser material processing, e.g., laser ablation or another laser process. Image enhancement (block 316) is performed to amplify the secondary emissions 202 and simplify the image analysis task as described with respect to blocks 322-330. By using a particular image filter or filters, a particular wavelength or wavelengths of light are expected from analysis of the secondary emissions 202. Any problem which degrades the laser material processing is detected when the particular wavelength or wavelengths of light which were expected are not present from the analysis of image data of the secondary emissions 202. The laser material process or laser ablation process may be degraded for a variety of reasons. The degraded process causes an impact to the received image or image data that is apparent from analysis of the image or image data as described herein. Examples of degradation of the laser material processing and image analysis results include but are not necessarily limited to: the laser did not fire (the image is black instead of blue); the laser power setting is too low (the image is black instead of blue); cover glass of the sensor 130 is covered with debris or dirty (recurring black spot in blue image); the scanner optics are contaminated (recurring horizontal or vertical black stripes in blue image); the laser beam conditioning optics are contaminated (the image fades from blue to black); the scanner device 120 is too close to the workpiece 106 (the image is black, or faint blue and smaller than expected); the scanner device 120 is too far from the workpiece 106 (the image is black, or faint blue and larger than expected). The analysis described is performable by machine learning software to create an "agent" which can be trained to perform the analysis.

In block 314, the image 200 or raw image data 626 corresponding to the image 200 is time stamped. The raw image data 626 and associated time stamp 628 are stored in a memory 608 of the computer system 616 (FIG. 6). In some examples the image 200 or raw image data 626 are time stamped during the laser material processing to provide a record that the workpiece 106 or a portion of the workpiece 106 was processed based on any established manufacturing criteria or standards.

In block 316, enhanced image data 630 (FIG. 6) is generated using an image enhancement library 317. The image enhancement library 317 includes a plurality of image enhancement tools 318 configured to generate the enhanced image data 630 from the raw image data 626. Examples of the image enhancement tools 318 applied to the raw image data 626 include but are not necessarily limited to lens correction, contrast enhancement, and noise removal. In some examples, generating the enhanced image data 630 includes at least one of: applying lens correction to the raw image data 626; performing contrast enhancement to the raw image data 626; and performing noise removal to the raw image data 626.

In block 320, the enhanced image data 630 is time stamped to provide a record that the workpiece 106 was processed based on any established manufacturing criteria or standards. The enhanced image data 630 and the associated time stamp 632 are stored in the memory 608 of the computer system 616 (FIG. 6). In some examples, determining the quality of the laser material processing includes analyzing the enhanced image data 630.

Determining the quality of the laser material processing in block 312 also includes verifying compliance of the laser material processing to specification requirements 324 in block 322. Verifying compliance of the laser material processing to the specification requirements 324 in block 322 includes at least one of: verifying (block 326) a geometry of an area on which the laser material processing was performed using the enhanced image data 630; verifying (block 328) a completeness of coverage of the area of the laser material processing using the enhanced image data 630; and detecting (block 330) any defects in the area on which the laser material processing was performed using the enhance image data 630.

In block 332, a determination is made whether the specification requirements 324 are met in block 322. If the specification requirements 324 are not met in block 332, the method 300 advances to block 334. In block 334, the workpiece 106 is rejected or reworked in response to the quality of the laser material processing failing to meet one or more specification requirements 324. In examples where the workpiece 106 is subdivided into a plurality of portions 402 or 404, the workpiece 106 is rejected or the portion 402 or 404 of the workpiece 106 is reworked.

If the specification requirements 324 are met in block 332, the method 300 advances to block 336. In block 336, results of analysis of the image 200 or raw image data 626 are presented. In accordance with the exemplary system 600 in FIG. 6, the results of the analysis of the image 200 or raw image data 626 are presented on a display 620 of the computer system 616. Compliance of the laser material processing is verified using the image 200 or raw image data 626 acquired by the sensor 130 during the laser material processing of the workpiece 106 or portion 402 or 404 of the workpiece 106. The laser material process is verified or is determined to be compliant based on the predetermined criteria previously described with reference to blocks 312-332.

In block 338, results 634 (FIG. 6) of the analysis of the image 200 or raw image data 626 are time stamped. The results 634 of the image analysis and a time stamp 636 associated with the results of analyzing the image 200 or raw image data 626 are stored for compliance verification and process validation. In some examples, the results 634 of the image analysis are time stamped to provide a record that the workpiece 106 or portion of the workpiece 106 where laser processed based on any established manufacturing criteria or standards.

In block 340, a determination is made whether there are other portions 402 or 404 or tiles of the workpiece 106 that need laser material processing. If there are no other portions 402 or 404, the method 300 ends at termination block 342. If there is another portion 402 or 404 of the workpiece 106 for laser material processing, the method 300 advances to block 344. In block 344, the end effector 104 moves in sequence to the next portion 402 or 404 or tile of the workpiece 106 as illustrated in the examples in FIG. 4A or 4B. The method 300 then returns to block 304 to perform laser material processing on the next portion 402 or 404 of the workpiece 106. The method 300 then proceeds similar to that previously described.

FIG. 6 is a block schematic diagram of an example of a system 600 for quality inspection of laser material processing in accordance with an embodiment of the present disclosure. In accordance with an example, the method 300 is embodied in and performed by the system 600. The system 600 includes a laser material processing system 602. In accordance with an example, the system 100 for laser material processing in FIG. 1 is part of the system 600 and is used for the laser material processing system 602. In other examples, the laser material processing system 602 may have different configurations than those illustrated and described herein but are capable of performing the method and operations described herein. The laser material processing system 602 includes a laser 110 configured to perform laser material processing on a workpiece 106 as previously described.

In accordance with an example, the system 600 includes the end effector 104 described with reference to FIG. 1. The system 600 includes a sensor 130 for acquiring an image 200 (FIG. 2) of secondary emissions 202 during laser material processing of the workpiece 106. The system 600 also includes a processor 606 configured for determining a quality of the laser material processing by analyzing the image 200 or raw image data 626 of the secondary emissions 202. A memory 608 is associated with the processor 606. The memory 608 includes computer-readable program instructions 610 that, when executed by the processor 606 causes the processor 606 to perform a set of functions 612 for quality inspection 614 of laser material processing as described herein. In accordance with an embodiment, at least some of the operations of the method 300 are embodied in the set of functions 612 for quality inspection 614 of laser material processing.

In the example illustrated in FIG. 6, the processor 606 and memory 608 are components of the computer system 616. The computer system 616 also includes an input/output (I/O) interface 618. The I/O interface 618 includes a display 620, a keyboard 622 or other mechanism to allow a user to control the system 600, and a data input 624 configured to receive raw image data 626 corresponding to the image 200 of secondary emissions 202 acquired by the sensor 130.

In accordance with an example, an aircraft includes a component 640, e.g., workpiece 106 in FIG. 1 is an aircraft component 640 as illustrated in FIG. 6, on which laser material processing is performed. Quality inspection of the laser material processing includes the set of functions 612. In some examples, the set of functions 612 include generating (block 308 in FIG. 3A), by a sensor 130, raw image data 626 of secondary emissions 202 during the laser material processing of the component 640. The set of functions 612 also include determining (block 312) a quality of the laser material processing by analyzing the raw image data 626 of the secondary emissions 202.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of embodiments of the disclosure. As used herein, the singular forms "a", "an" and "the" are intended to include the plural forms as well, unless the context clearly indicates otherwise. It will be further understood that the terms "include," "includes," "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present embodiments has been presented for purposes of illustration and description, but is not intended to be exhaustive or limited to embodiments in the form disclosed. Many modifications and variations will be apparent to those of ordinary skill in the art without departing from the scope and spirit of embodiments.

Although specific embodiments have been illustrated and described herein, those of ordinary skill in the art appreciate that any arrangement which is calculated to achieve the same purpose may be substituted for the specific embodiments shown and that the embodiments have other applications in other environments. This application is intended to cover any adaptations or variations. The following claims are in no way intended to limit the scope of embodiments of the disclosure to the specific embodiments described herein.

What is claimed is:

1. A method for quality inspection of laser material processing, comprising:
performing laser material processing on a workpiece;
generating, by a sensor, raw image data of secondary emissions during the laser material processing of the workpiece; and
determining a quality of the laser material processing by analyzing the raw image data of the secondary emissions.

2. The method of claim 1, further comprising generating enhanced image data using an image enhancement library, wherein the image enhancement library comprises a plurality of image enhancement tools configured to generate the enhanced image data from the raw image data.

3. The method of claim 2, wherein generating the enhanced image data comprises at least one of:
applying lens correction to the raw image data;
performing contrast enhancement to the raw image data; and
performing noise removal to the raw image data.

4. The method of claim 1, wherein determining the quality of the laser material processing comprises verifying compliance of the laser material processing to specification requirements using enhanced image data.

5. The method of claim 4, wherein verifying compliance of the laser material processing to the specification requirements comprises at least one of:
verifying a geometry of an area on which the laser material processing was performed using the enhanced image data;
verifying a completeness of coverage of the area of the laser material processing using the enhanced image data; and
detecting any defects in the area on which the laser material processing was performed using the enhanced image data.

6. The method of claim 1, further comprising rejecting the workpiece or reworking the workpiece in response to the quality of the laser material processing failing to meet one or more specification requirements.

7. The method of claim 1, further comprising storing a result of analyzing the raw image data and a time stamp associated with the result of analyzing the raw image data for verification of the laser material processing.

8. The method of claim 1, wherein performing laser material processing comprises performing laser material processing on a plurality of portions of the workpiece and wherein generating the raw image data of the secondary emissions during the laser material processing comprises generating separate raw image data for each portion of the plurality of portions of the workpiece.

9. The method of claim 8, further comprising determining the quality of the laser material processing by analyzing the separate raw image data for each portion of the plurality of portions of the workpiece.

10. The method of claim 1, wherein performing laser material processing comprises performing ablation of a surface of a panel of composite material using a laser, wherein the laser comprises a wavelength and an intensity corresponding to a composition of the panel of composite material.

11. The method of claim 10, wherein generating the raw image data of the secondary emissions comprises measuring and recording a wavelength and an intensity of the secondary emissions using the sensor and wherein determining the quality of the laser material processing comprises determining a quality of the ablation of the panel of composite material by comparison of the measured wavelength and intensity of the secondary emissions to a minimum wavelength and intensity.

12. The method of claim 1, wherein the workpiece comprises a component of an aircraft.

13. A system for quality inspection of laser material processing, comprising:
a sensor for generating raw image data of secondary emissions during laser material processing of a workpiece; and
a processor configured for determining a quality of the laser material processing by analyzing the raw image data of the secondary emissions.

14. The system of claim 13, further comprising image enhancement tools configured to generate enhanced image data from the raw image data, wherein the enhanced image data is used to determine the quality of the laser material processing.

15. The system of claim 13, further comprising a purge system configured to provide air or gas flow to prevent particles caused by the laser material processing from obstructing the sensor from generating the raw image data of the secondary emissions.

16. The system of claim 13, wherein determining the quality of the laser material processing comprises verifying compliance of the laser material processing to specification requirements using enhanced image data.

17. The system of claim 16, wherein verifying compliance of the laser material processing to the specification requirements comprises at least one of:
verifying a geometry of an area on which the laser material processing was performed using the enhanced image data;
verifying a completeness of coverage of the area of the laser material processing using the enhanced image data; and
detecting any defects in the area on which the laser material processing was performed using the enhanced image data.

18. The system of claim 13, wherein the workpiece is rejected or reworked in response to the quality of the laser material processing failing to meet one or more specification requirements.

19. The system of claim 13, further comprising a memory associated with the processor for storing a result of analyzing the raw image data and a time stamp associated with the result of analyzing the raw image data for verification of the laser material processing.

20. The system of claim 13, further comprising a device to perform laser material processing on a plurality of portions of the workpiece and the sensor generates separate raw image data of the secondary emissions during the laser material processing of each portion of the plurality of portions of the workpiece, wherein the quality of the laser material processing is determined by analyzing the raw image data of each portion of the plurality of portions of the workpiece.

* * * * *